United States Patent
Entsfellner et al.

(10) Patent No.: US 10,270,546 B2
(45) Date of Patent: Apr. 23, 2019

(54) METHOD FOR MEASURING PASSIVE INTERMODULATION AND MEASURING DEVICE

(71) Applicant: ROSENBERGER HOCHFREQUENZTECHNIK GMBH & CO. KG, Fridolfing (DE)

(72) Inventors: Christian Entsfellner, Fridolfing (DE); Benjamin Kaindl, Fridolfing (DE); Martin Schwab, Gelting/Geretsried (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 0 days.

(21) Appl. No.: 15/511,526

(22) PCT Filed: Sep. 10, 2015

(86) PCT No.: PCT/EP2015/001826
§ 371 (c)(1),
(2) Date: Mar. 15, 2017

(87) PCT Pub. No.: WO2016/041627
PCT Pub. Date: Mar. 24, 2016

(65) Prior Publication Data
US 2017/0302390 A1    Oct. 19, 2017

(30) Foreign Application Priority Data

Sep. 19, 2014 (DE) .................. 10 2014 013 968

(51) Int. Cl.
*H04B 10/07*      (2013.01)
*H04B 17/345*     (2015.01)
(Continued)

(52) U.S. Cl.
CPC ............. *H04B 17/345* (2015.01); *H04B 3/46* (2013.01); *H04B 10/07* (2013.01); *H04B 17/0085* (2013.01); *H04B 17/104* (2015.01)

(58) Field of Classification Search
None
See application file for complete search history.

(56) References Cited

U.S. PATENT DOCUMENTS 6,144,692 A * 11/2000 Beck ................ G01R 29/10
                                              343/703
2009/0096466 A1* 4/2009 Delforce .............. H04B 17/23
                                              324/612
(Continued)

FOREIGN PATENT DOCUMENTS

DE   102010015102 A1   10/2011
DE   102012023448 A1    6/2014
(Continued)

*Primary Examiner* — David Bilodeau
(74) *Attorney, Agent, or Firm* — DeLio, Peterson & Curcio, LLC; Robert Curcio (57) ABSTRACT

A method for measuring intermodulation produced in a measurement segment of a signal transmission path, by: producing a first HF signal ($u_1(t)$) and a second HF signal ($u_2(t)$), both having a predetermined frequency progression; feeding the first HF signal ($u_1(t)$) and the second HF signal ($u_2(t)$) to the signal transmission path, wherein an intermodulation signal is produced, which intermodulation signal has a first intermodulation signal component ($u_{rPIM}(t)$) produced in an input segment of the signal transmission path and a second intermodulation signal component ($u_{PIM}(t)$) produced in the measurement segment of the signal transmission path; producing a compensation signal ($u_c(t)$) in accordance with the first intermodulation signal component ($u_{rPIM}(t)$) produced in the input segment; introducing the compensation signal ($u_c(t)$) into the signal transmission path in order to reduce or cancel out the first intermodulation (Continued)

signal component ($u_{rPIM}(t)$). The invention further relates to a measuring device for performing said method.

19 Claims, 6 Drawing Sheets

(51) Int. Cl.
*H04B 3/46* (2015.01)
*H04B 17/00* (2015.01)
*H04B 17/10* (2015.01)

(56) References Cited

U.S. PATENT DOCUMENTS

| | | | |
|---|---|---|---|
| 2010/0164504 A1* | 7/2010 | Bradley | H04B 3/46 |
| | | | 324/520 |
| 2013/0054169 A1* | 2/2013 | Neidhardt | H04B 17/0085 |
| | | | 702/69 |
| 2013/0182753 A1* | 7/2013 | Delforce | H04B 17/0085 |
| | | | 375/228 |
| 2017/0126337 A1* | 5/2017 | Schwab | H04B 17/17 |

FOREIGN PATENT DOCUMENTS

| | | | |
|---|---|---|---|
| DE | 102014007151 A1 | 11/2015 | |
| JP | 2005094627 A | 9/2003 | |

\* cited by examiner

METHOD FOR MEASURING PASSIVE INTERMODULATION AND MEASURING DEVICE

BACKGROUND OF THE INVENTION

1. Field of the Invention

The present invention relates in general to measuring systems for high frequency communication systems and specifically to measuring devices for measuring passive intermodulation.

In particular, the present invention relates to a method for measuring intermodulation generated in a signal transmission path in which a first HF signal $u_1(t)$ with a predetermined frequency progression and a second HF signal $u_2(t)$ with a predetermined frequency progression are generated and the first HF signal $u_1(t)$ and the second HF signal $u_2(t)$ are introduced into the signal transmission path, wherein an intermodulation signal containing intermodulation products is produced in the signal transmission path from the first HF signal $u_1(t)$ and the second HF signal $u_2(t)$. Such an intermodulation signal can for example contain indications of the location of defective points in the signal transmission path and can therefore be used to locate faults. The invention further relates to a measuring device for carrying out such a method.

2. Description of Related Art

Description of Passive Intermodulation (PIM)

The quality of a connection between a permanently installed transmitting and receiving installation (BTS, base transceiver station) and a terminal device (UE, user equipment) plays a key role in modem mobile networks. Due to the high power generated in the BTS on the one hand and the necessary sensitivity of the receivers of the BTS and. UE on the other hand, faults in the transmission path can significantly influence the sensitivity of the receivers and thus the quality of the connection.

One key effect which gives rise to faults in the transmission path is intermodulation. For example, through intermodulation, two transmission signals with two different carrier frequencies which are generated with high power in a BTS generate interfering signals at points with non-linear transmission behavior (often simply referred to as "non-linearities"), the frequencies of which are sums and differences of integer multiples of the frequencies of the transmission signals.

Some of these interfering signals can fall within the reception band of the BTS and thus adversely affect the quality of the communication. If these interfering signals are generated in passive elements, this is referred to as passive intermodulation (PIM).

Figure 1:
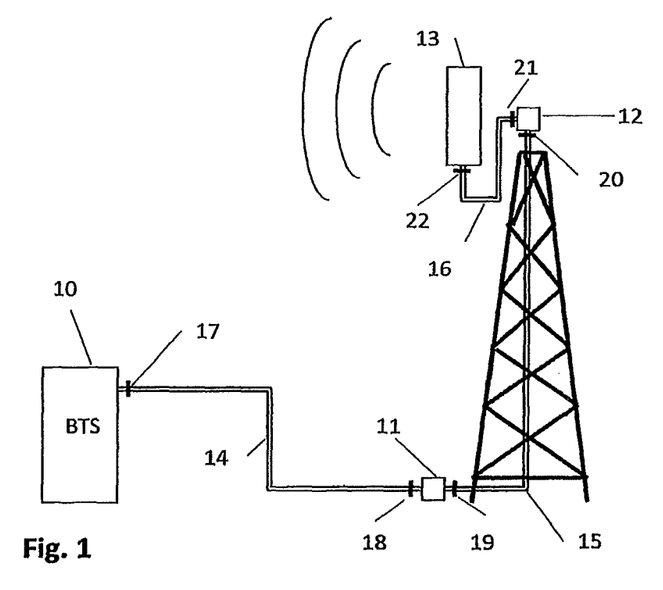
FIG. 1 is a schematic representation which shows a transmission path from a BTS to an antenna.

FIG. 1 is a schematic representation showing a signal transmission path from a BTS up to an antenna. The BTS 10 is connected with the antenna 13 via a first filter 11 and a second filter 12. The BTS 10, the filters 11 and 12 and the antenna 13 are connected together via high-frequency cables 14, 15 and 16, which are connected to the respective elements via high-frequency connectors 17 to 22.

PIM can occur in all components 11 to 22 of the transmission path. For example, corrosion in plug connectors, oxide coatings on contacts and metal-metal transitions, impurities in materials and insufficiently fastened plug connections can cause PIM.

In order to ensure and check the quality of the transmission device, and/or in order to locate such faults, measurements of the PIM are carried out. Since PIM occurs in particular at high powers, as a rule this is measured with the use of high transmitting power, for example 2*20 W.

Structure of Conventional PIM Measuring Devices

Figure 2:
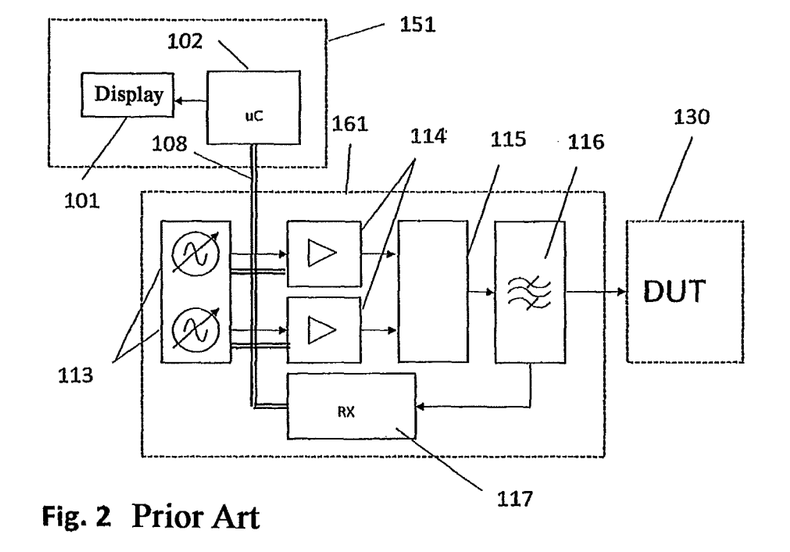
FIG. 2 is a block diagram illustrating the set-up of a conventional PIM test device.

Special measuring devices are available for the measurement of PIM. A conventional PIM analyzer is represented by way of example in FIG. 2. It consists of a control unit 151 and a signal unit 161. In the signal unit 161, high frequency signals with suitable different frequencies $f_1$ and $f_2$ are generated in the signal sources 113 and amplified in the two power amplifiers 114. In the combiner/adder 115, the two transmission signals are combined and sent to the device 130 which is to be tested (device under test, DUT). The PIM occurring in the DUT 130 is selected in the filter 116 and detected and measured in the measuring receiver 117. The control, analysis of the measuring results, and representation take place in the control unit 151.

Such a device is for example described in the publication DE 10 2010 015 102 A1.

Problem Which is to be Solved Through the Invention

However, it has been found that, due to noise and other interference signals or undesired signal components in the intermodulation signal, the method and measuring devices described above often do not permit satisfactory quality testing of signal transmission paths. In particular, the spatial resolution achieved in the location of faults is often inadequate.

SUMMARY OF THE INVENTION

In view of the problems described, the object of the present invention is to improve a method for measuring passive intermodulation generated in a signal transmission path while reducing undesirable interference signals in that an optimal quality testing of a segment of the signal transmission path which is to be tested as well as a reliable location of any faults which may be present therein is possible.

This problem is solved through a measuring method and a measuring device according to the independent claims. Advantageous optional method features are described in the dependent claims.

The above and other objects, which will be apparent to those skilled in the art, are achieved in the present invention which is directed to a method for measuring passive intermodulation produced in a measurement segment of a signal transmission path, comprising the following steps: (a) generating a first HF signal ($u_1(t)$) with a predetermined frequency progression and a second HF signal ($u_2(t)$) with a predetermined frequency progression; (b) feeding the first HF signal ($u_1(t)$) and the second HF signal ($u_2(t)$) into the signal transmission path, wherein an intermodulation signal is generated in the signal transmission path from the first HF signal ($u_1(t)$) and the second HF signal ($u_2(t)$) which contains a first intermodulation signal component ($u_{rPIM}(t)$) generated in an input segment of the signal transmission path and a second intermodulation signal component ($u_{PIM}(t)$) generated in the measurement segment of the signal transmission path; (c) generating a compensation signal ($u_c(t)$) depending on the first intermodulation signal component ($u_{rPIM}(t)$) generated in the input segment; and (d) introducing the compensation signal ($u_c(t)$) into the signal transmission path in order to reduce or cancel out the first intermodulation signal component ($u_{rPIM}(t)$).

The method further including: (e) measuring a reflected intermodulation signal component $u_{rx1}$ and from this locating one or more points in the measurement segment of the signal transmission path which are defective in terms of high frequency transmission characteristics of the signal transmission path.

The first and/or the second HF signal may be amplified, added and then introduced into the signal transmission path.

At least a part of the first intermodulation signal component ($u_{rPIM}(t)$) is separated from the second intermodulation signal component ($u_{PIM}(t)$), using a directional coupler and/or a filter.

One or more variables such as a power, an amplitude, a phase or similar of the separated part is measured and the compensation signal ($u_c(t)$) is generated on the basis of at least one of the measured variables.

The compensation signal ($u_c(t)$) may be controlled in an iterative method such that maximum compensation of the first intermodulation signal component ($u_{rPIM}(t)$) is achieved when it is introduced. The compensation signal ($u_c(t)$) is preferably generated by a control loop with alternating adjustment of its amplitude $a_{rPIM}$ and its phase $\Phi_{rPIM}$ such that the power of the separated part of the first intermodulation signal component ($u_{rPIM}(t)$) is minimized.

The compensation signal ($u_c(t)$) is preferably introduced into the signal transmission path between the input segment and the measurement segment by a directional coupler.

A variable such as an amplitude, a phase and/or a time delay of the first intermodulation signal component ($u_{rPIM}(t)$) may be determined by a time window method.

The first HF signal ($u_1(t)$) and the second HF signal ($u_2(t)$) are preferably generated with predetermined different carrier frequencies $f_1$, $f_2$, wherein a preferably digital signal is modulated onto at least one of the carrier frequencies.

The first carrier frequency $f_1$ and/or the second carrier frequency $f_2$ are modulated such that an intermodulation signal generated from the two HF signals contains information on the points at which intermodulation signal components contained therein are generated. The frequency $f_1$ of the first HF signal ($u_1(t)$) is varied continuously and repeatedly over time (swept) from a predetermined initial frequency $f_{START}$ to a predetermined end frequency $f_{END}$ with a predetermined rate of change df/dt over time, and that the second HF signal ($u_2(t)$) is preferably generated with a constant predetermined frequency $f_2$.

In a second aspect, the present invention is directed to a measuring device for measuring passive intermodulation produced in a measurement segment of a signal transmission path, the measuring device implementing the following steps: (a) generating a first HF signal ($u_f(t)$) with a predetermined frequency progression and a second HF signal ($u_2(t)$) with a predetermined frequency progression; (b) feeding the first HF signal ($u_1(t)$) and the second HF signal ($u_2(t)$) into the signal transmission path, wherein an intermodulation signal is generated in the signal transmission path from the first HF signal ($u_1(t)$) and the second HF signal ($u_2(t)$) which contains a first intermodulation signal component ($u_{rPIM}(t)$) generated in an input segment of the signal transmission path and a second intermodulation signal component ($u_{PIM}(t)$) generated in the measurement segment of the signal transmission path; (c) generating a compensation signal ($u_c(t)$) depending on the first intermodulation signal component ($u_{rPIM}(t)$) generated in the input segment; and (d) introducing the compensation signal ($u_c(t)$) into the signal transmission path in order to reduce or cancel out the first intermodulation signal component ($u_{rPIM}(t)$).

The measuring device includes: two signal sources for generating two HF signals; a combiner for combining the two HF signals and introducing them into a signal transmission path with an input segment and an adjoining measurement segment; a device such as a filter for decoupling an intermodulation signal component generated in the signal transmission path, and a compensation unit for generating a compensation signal ($u_c(t)$) depending on the component of the intermodulation signal generated in the input segment of the signal transmission path and for coupling the compensation signal ($u_c(t)$) into the signal transmission path.

The measuring device further includes a directional coupler, preferably arranged in the signal transmission path between the input segment and the measurement segment, for coupling the compensation signal ($u_c(t)$) into the signal transmission path and/or for decoupling a signal component $u_{rx2}$ running in from the input segment.

The measuring device may also include a third signal source and a modulator for generating the compensation signal in an iterative method such that a minimization of the first intermodulation signal component ($u_{rPIM}(t)$) is achieved.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-9 of the drawings in which like numerals refer to like features of the invention.

The signal transmission path of the present invention consists of two segments, namely the input segment and the measurement segment, wherein components of an intermodulation signal, for example intermodulation products of a given order, can be generated both in the input segment and also in the adjoining measurement segment. The input segment can in particular comprise a part of the signal transmission path extending from the combiner 115 via the filter 116 and beyond, while the measurement segment forms that adjoining part of the signal transmission path which is to be tested for its quality and for possible faults.

The invention is in particular based on the knowledge that, as in all components of the signal transmission path represented in FIG. 1, passive intermodulation can also occur within the measuring device, which is referred to in the following as inherent interference or rPIM (residual PIM). This is, in FIG. 2, in particular the case in the filter 116 and/or in the combiner 115, which are arranged in the input segment of the signal transmission path. The use of very high quality and expensive filters currently represents the state of the art. Nonetheless, the measuring accuracy and measuring sensitivity of the measuring device is significantly affected by the inherent interference of the filter 115 and other components in the input segment.

According to the invention, this inherent interference generated by the measuring device itself or by components arranged in the input segment is reduced and thus the measuring accuracy increased in that a compensation signal $u_c(t)$ dependent on the first intermodulation signal component $u_{rPIM}(t)$ generated in the input segment is generated, and the compensation signal $u_c(t)$ is coupled into the signal transmission path in order to reduce or cancel out the first intermodulation signal component $u_{rPIM}(t)$.

In the method of the aforementioned type, according to the invention at least some, preferably all of the following steps can be carried out:
1) generation, amplification and addition of at least two HF signals;
2) calculation of the frequency of the intermodulation;
3) separation of inherent interference from the measuring device (first intermodulation signal component) from a measuring signal (second intermodulation signal component);
4) demodulation, power measurement and/or filtering of the inherent interference;
5) calculation and generation of the compensation signal; and
6) feeding the compensation signal into the signal transmission path.

Following feeding of the compensation signal, the intermodulation signal reflected back to the measuring device then comprises virtually only, or exclusively, intermodulation signal components generated in the measurement segment. The reflected intermodulation signal component $u_{rx1}$ can then be measured and, from this, one or more points in the measurement segment of the signal transmission path located which are defective in terms of high frequency transmission characteristics of the signal transmission path. Consequently, the reflected intermodulation signal hardly contains any more interfering intermodulation product components generated by the measuring device itself which could affect the measurement quality.

Preferably, following generation the first and/or the second HF signal are amplified, added and then introduced into the signal transmission path.

Particularly important is a reliable separation of the intermodulation products generated in the measurement segment from the intermodulation products which are generated through the measuring device itself and which need to be compensated, since the compensation signal is to be generated on the basis of the intermodulation products generated in the measuring device. Therefore, preferably at least a part of the first intermodulation signal component $u_{rPIM}(t)$ is separated from the second intermodulation signal component $u_{PIM}(t)$, preferably using a directional coupler. Using the directional coupler, a component of a total signal $u_{tot}$ running out of the input segment or out of the measuring device can be coupled out, since this output component only contains the first intermodulation signal component, but not the second intermodulation signal component. After it has been coupled out, the first intermodulation signal component can be separated out from components of the first and second HF signals which are also being output, for example by means of a filter. For this purpose it is expedient if the intermodulation signal lies in a different frequency range than the two HF signals $u_1$, $u_2$, so that a reliable separation is possible. For example, the intermodulation signal comprises third order intermodulation products with the frequency $(2f_1-f_2)$ or similar. Alternatively, the intermodulation signal comprises second, fifth or seventh order intermodulation products.

Following separation, one or more variables of the decoupled first intermodulation signal component such as its power, amplitude and/or phase are measured, and the compensation signal $u_c(t)$ can be generated on the basis of at least one of these measured variables. Preferably, the compensation signal is generated such that its superimposition with the first intermodulation signal component in the signal transmission path cancels this out or minimizes this. For this purpose it can be the case that: $u_c(t)=-u_{rPIM}(t)$.

In the case of a sinusoidal intermodulation signal, $u_c(t)$ can for example substantially correspond to the first intermodulation signal component phase shifted by 180°. In the case of modulated HF signals, the intermodulation signal is also modulated, wherein this anticipated modulation can be determined starting out from the HF signals. The compensation signal can then be generated with a modulation corresponding to the anticipated modulation and adapted in terms of power or amplitude and phase such that the first intermodulation signal is minimized through the feeding-in of the generated compensation signal.

In terms of achieving a particularly exact generation of the compensation signal as well as in terms of adaptation to possible signal changes through external influences or similar it has proved expedient for the compensation signal $u_c(t)$ to be controlled or repeatedly adapted in an iterative method such that its introduction into the signal transmission path results in a minimization of the first intermodulation signal component $u_{rPIM}(t)$.

In terms of achieving a reliable elimination of the inherent interference of the measuring device it has proved advantageous for the compensation signal to be generated and introduced into the signal transmission path such that the power of the parts of the first intermodulation signal decoupled through the directional coupler is minimized, because the power of a separated signal component can be measured particularly simply and reliably. Depending on the measured power, an adaptation of the compensation signal which is to be generated takes place, wherein in particular the amplitude and/or the phase of the compensation signal which is to be generated can be adapted. According to a particularly preferred method according to the invention, the phase and the amplitude of the compensation signal which is to be generated are used alternately as a control parameter and in each case varied until the power of the decoupled first intermodulation signal component is minimized. In this way, an elimination of the inherent interference is achieved particularly quickly and in a few iteration steps.

Alternatively however, only one or also more than two control parameters can be used. In these cases, an iterative method is not necessarily essential.

Advantageously, the compensation signal $u_c(t)$ is, in particular, introduced into the signal transmission path between the input segment and the measurement segment by means of a directional coupler. Alternatively, an introduction at other points is for example already possible immediately during or also following the generation of the first and/or second HF signal.

The use of the directional coupler has the advantage that it can be used both for the decoupling of a component of the intermodulation signal which is to be separated and measured and also to couple in the compensation signal.

Alternatively, or in addition, the first intermodulation signal component $u_{rPIM}(t)$ can be separated from the second intermodulation signal component $u_{PIM}(t)$ by means of a time window method. In a "time window method", PIM components are determined which lie within a specified time window, which can correspond to the input segment.

Where a time window method is used it is not necessary, or not exclusively necessary, to decouple at least a part of the inherent interference (or of the first intermodulation signal) by means of a directional coupler or similar. Instead, the two HF signals $u_1$ and $u_2$ are already generated such that an intermodulation signal generated from the two HF signals contains information on where intermodulation signal components contained therein are generated. This is made possible through a predetermined signal progression or a predetermined modulation of the first and/or second HF signal, in which, depending on the point of generation of an intermodulation product generated from the combination signal $u_1+u_2$, a predetermined defined progression over time (or a predetermined modulation progression) of the intermodulation signal is obtained which, following analysis or following comparison with the first and/or second HF signal or a comparison signal generated therefrom, allows conclusions to be drawn regarding the point of generation of the intermodulation product.

For example, the frequency $f_1$ of the first HF signal $u_1(t)$ is varied continuously and repeatedly over time (swept) from a predetermined initial frequency $f_{START}$ to a predetermined end frequency $f_{END}$ with a predetermined rate of change df/dt over time and the second HF signal is generated with a constant predetermined frequency $f_2$. In this case, the point of generation of an intermodulation product reflected from the signal path can be determined from a frequency difference between the frequency of the reflected intermodulation product and the frequency of an intermodulation product generated at a known location. Details are described in the publication DE 10 2010 015 102 A1 already cited and are included in the present disclosure by way of reference. The compensation signal can then be generated on the basis of the first intermodulation signal component generated in the signal transmission path before the beginning of the measurement segment and fed into the signal transmission path at a predetermined feed point.

Other time progressions and/or modulations of the HF signals enabling a time window method are possible. According to a particularly advantageous embodiment of a time window method, at least one of the HF signals is generated with a carrier frequency and a digital signal $u_{CODE}$ modulated thereon. Details of such a time window method are disclosed in the as yet unpublished patent application DE 10 2014 007 151.0 and are included in the present disclosure by way of reference. Expediently, a preferably periodic frame-clock signal is multiplied by a spreading code in order to generate the digital signal $U_{CODE}$, said spreading code preferably comprising a sequence of chips.

In all of the embodiments described above, the first HF signal $u_1(t)$ and the second HF signal $u_2(t)$ are preferably generated with predetermined different carrier frequencies $f_1$, $f_2$, so that the frequency of the intermodulation signal differs from the carrier frequencies. At least one carrier frequency can include a preferably digital signal modulated onto the carrier frequency with a predetermined modulation type.

According to a further aspect, the invention comprises a measuring device for carrying out the method according to the invention.

This measuring device preferably comprises: two signal sources for generating two HF signals $u_1(t)$, $u_2(t)$, a combiner for combining the two HF signals and introducing them into a signal transmission path with an input segment and an adjoining measurement segment, a device for decoupling an intermodulation signal component generated in the signal transmission path and a compensation unit for generating a compensation signal $u_c(t)$ depending on the component of the intermodulation signal generated in the input segment of the signal transmission path and optionally for coupling the compensation signal $u_c(t)$ into the signal transmission path.

The combiner and the device used for decoupling, in particular a filter, can be provided in the form of a single component such as a filter-combiner.

The features described in connection with the method according to the invention can also be provided, mutatis mutandis, individually or in any combination in the measuring device according to the invention, whereby reference is made to the remarks above.

In particular, the measuring device can include a directional coupler, preferably arranged in the signal transmission path between the input segment and the measurement segment, for coupling the compensation signal $u_c(t)$ into the signal transmission path and/or for decoupling a signal component $U_{rx2}$ originating from the input segment and running into the directional coupler.

The compensation signal can be generated by means of a third signal source and/or a modulator in an iterative method such that a minimization of the first intermodulation signal component $u_{rPIM}(t)$ results.

In a preferred embodiment, the measuring device according to the invention for measuring preferably passive intermodulation with compensation of the inherent interference comprises a measuring system, a controller unit and a compensation unit (predistortion unit). The inherent interference (or the first intermodulation signal component) is separated from the second intermodulation signal component which is to be measured by the compensation unit. In a receiver, the inherent interference can be demodulated, detected and/or its power determined.

The parameters for a correction signal can be calculated in the control unit, and the compensation signal (correction signal) can then be generated in a signal source and a modulator and coupled into the signal transmission path.

Alternatively, or in addition, a control loop varies the parameters of the compensation signal iteratively, until the inherent interference is minimized.

Further advantageous features of the invention are explained in the following description with reference to the attached drawings, to which reference is expressly made with respect to details important to the invention which are not explained in detail in the description.

Figure 3:
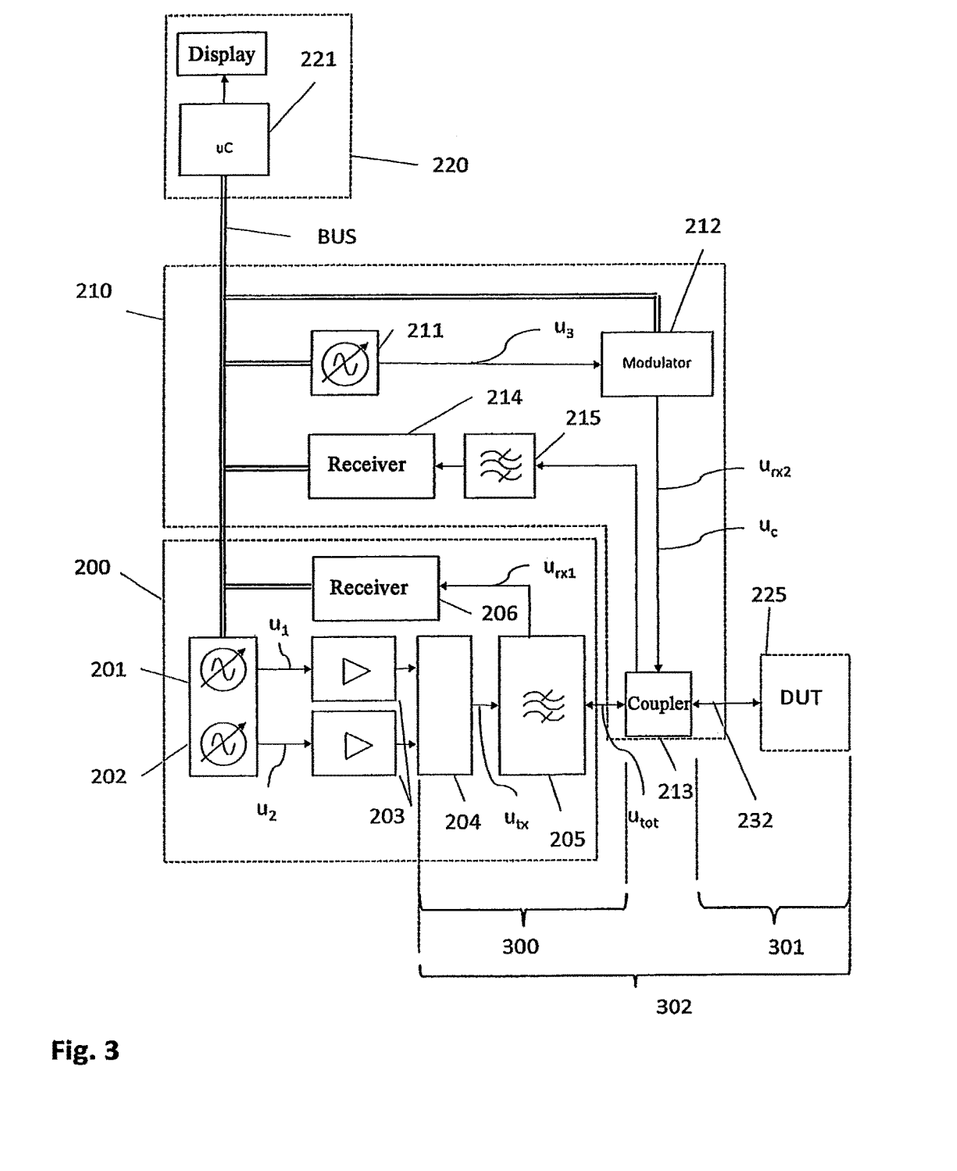
FIG. 3 is a schematic representation which shows a measuring device according to a first embodiment of the present invention designed to carry out the method according to the invention.

FIG. 3 is a schematic representation of a first embodiment of a measuring device according to the invention for carrying out the method according to the invention for the measurement of PIM with predistortion. This embodiment consists of a measuring unit 200, a predistortion unit 210, a controller unit 220, and a Device Under Test (DUT) 225.

Measuring unit: the measuring unit 200 consists of at least 2 signal sources 201 and 202, at least 2 amplifiers 203, a combiner 204, a filter 205 and a receiver 206.

Signal sources: the two signal sources 201 and 202 are connected with a controller unit 220. They generate signals $u_1(t)$ and $u_2(t)$ which, depending on the embodiment, can be sinusoidal or modulated. Preferably, the two signals have different carrier frequencies $f_1$ and $f_2$.

Amplifiers: The two signal sources are connected with the two amplifiers 203.

Combiner: the combiner 204 is connected with the two amplifiers 203 on the one hand, and with the TX path of the filter 205 on the other hand.

Filter: the filter 205 is connected on the one hand with the combiner 204 and with a receiver 206. On the other hand, the filter 205 is connected with a (directional) coupler 213.

Receiver: the receiver 206 is connected on the one hand with the filter 205, and on the other hand with the controller unit 220.

Predistortion unit: the predistortion unit 210 comprises: a signal source 211, a modulator 212, a coupler 213, a receiver 214 and a filter 215.

Signal source: the predistortion unit includes the signal source 211 for generating at least one carrier frequency (for example $2f_1-f_2$) of the compensation signal, which is connected on the one hand with the controller unit 220 and on the other hand with the modulator 212.

Modulator: the modulator 212 is connected with the signal source 211, the controller unit 220 and the coupler 213 and serves to modulate the signals generated by the signal source 211 in order to generate the compensation signal.

Second receiver: a second receiver 214 is connected with the coupler 213 and the controller unit 220. This receiver 214 serves to receive and possibly measure a decoupled component of the inherent signal (or first intermodulation signal component) which is to be minimized.

Coupler: the coupler 213 connects the measuring unit 200 with the DUT 225, as well as the second receiver 214 and the modulator 212.

The designations of the signals occurring during intermodulation are defined in the following.

Figure 4:
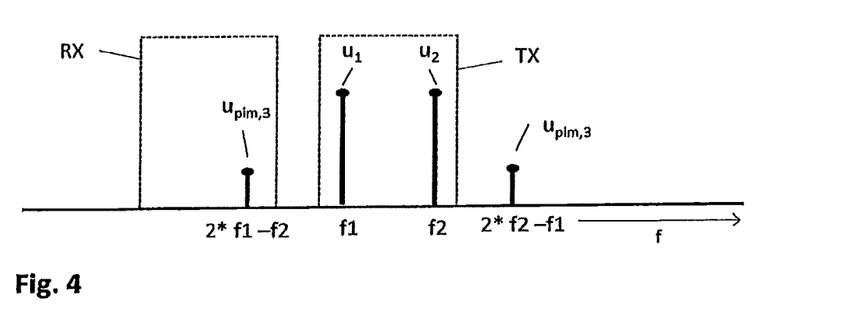
FIG. 4 is a schematic representation of the signals in the signal transmission path following generation of a third order intermodulation signal.

FIG. 4 shows by way of example two signals and the generation of PIM. Two signals $u_1$ and $u_2$ have the carrier frequencies $f_1$ and $f_2$. Intermodulation products $U_{PIM,o}$ of the order o are thereby produced at nonlinearities according to $$f_{pim} = nf_1 + mf_2 \qquad (1)$$

$$o = |n| + |m| \qquad (2)$$

The two signals $u_1$ and $u_2$, as well as intermodulation products (in the example shown 3rd order $U_{PIM,3}$ with the frequencies $2f_1-f_2$ and $2f_2-f_1$) are represented in FIG. 4. In the case of installations according to FIG. 1, $u_1$ and $u_2$ lie within the transmission band which is identified in FIG. 4 with TX. The function of the transmission installation is in particular interfered with if, as illustrated in FIG. 4, $u_{PIM,3}$ falls within the reception band which is identified in FIG. 4 with RX. The variables m, n, o are integers.

The measuring unit 200 is used to measure passive intermodulation in the DUT.

For this purpose, two signals $u_1$ and $u_2$ are first generated in the two signal generators 201 and 202. These signals can be amplitude- and phase-modulated.

In the described embodiment, $u_1$ is phase-modulated and $u_2$ sinusoidal:

$$u_1(t) = a_1 e^{j2\pi f_1} e^{j q_1(t)} \qquad (3)$$

$$u_2(t) = a_2 e^{j2\pi f_2 t} \qquad (4)$$

In the combiner 204, $u_1$ and $u_2$ are added to produce $u_{tx}$. The signal $u_{tot}$ at the output of the filter consists (without taking into account the inherent interference and the correction signals explained in the following) of $$u'_{tot}(t) = u_1(t) + u_2(t) + u_{PIM,o}(t) \qquad (5)$$

In the filter 205, the TX band and RX band are separated, so that the signal $u_{PIM,o}$ is present at the input of the receiver 206. Following calculation of the frequency $f_{PIM}$, the signal $u_{PIM,o}$ is received and the power of the signal is measured and digitized. Via the BUS, the power is transmitted to the controller unit 220, where it is displayed. The signal amplitude can be used as a measure for the line quality.

The signal can also be used to locate faults. In this connection reference is made to the publications DE 10 2010 015 102 A1 and DE 10 2012 023 448 A1, the content of which, insofar as it relates to the location of defective points in signal transmission paths, is incorporated in full in the present disclosure by way of reference.

The method steps characterizing the method according to the invention are explained in more detail herein.

Figure 5:
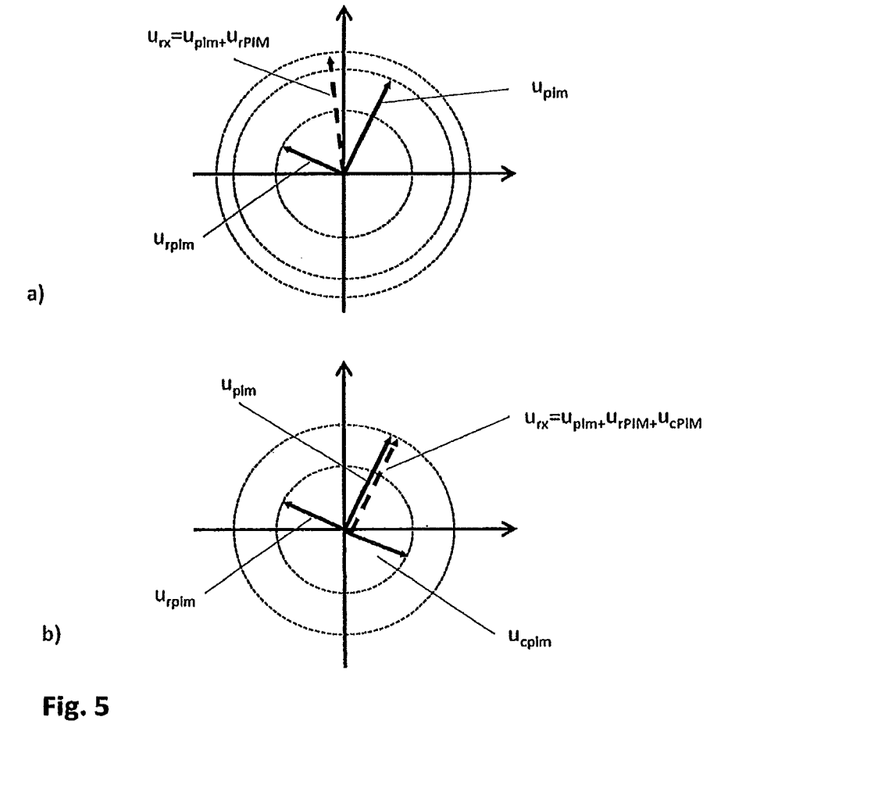
FIG. 5 is an exemplary representation of the first intermodulation signal component $u_{rPIM}$, of the compensation signal $u_{cPIM}$ and of the second intermodulation signal component $u_{PIM}$.

Inherent interference (or first intermodulation signal components), referred to in the following as residual passive intermodulation ($r_{PIM}$), is generated at nonlinearities, in particular in the combiner 204, in the filter 205 and/or at transitions in the signal transmission path according to the same mechanisms as in the case of PIM. Since the inherent interference follows the same mechanism in its generation but is generated at different points along the transmission path and has a different amplitude, $r_{PIM}$ of the order o can be represented as:

$$u_{rPIM,o}(t) + u_{PIM}(t) a_{rPIM} e^{j\phi_{rPIM}} \qquad (6)$$

where $a_{rPIM}$ represents the amplitude. The phase shift is indicated with $\phi_{rPIM}$. The distortion of the measuring result for $u_{rx}$ is represented in FIG. 5a. The two pointers of the signals $U_{PIM}$ and $u_{rPIM}$ add up to the signal $u_{rx}$. The distortion of the power measurement results from the difference in the pointer lengths of $u_{rx}$ and $u_{PIM}$.

Effect of the predistortion: the fundamental idea of the method according to the invention involves compensating the inherent interference and consequently improving the accuracy of the measurement. For this purpose, a compensation signal $u_c$ (also referred to as $u_{cPIM}$) is generated which cancels out the signal $u_{rPIM,o}$:

$$u_c + u_{rPIM,o} = 0 \qquad (7)$$

FIG. 5b shows the signals $u_{PIM}$, $u_{rPIM}$ and $u_c$ in the pointer diagram.

The compensation signal $u_c$ is generated in the modulator 212. The signal $u_{PIM}(t)$ has the time progression:

$$u_{PIM}(t) = a_{PIM} e^{j\pi(nf_1 + mf_2)t} e^{j(m+n)\Theta_1(t)} \qquad (8)$$

For this purpose, the coefficients m and n are calculated in the controller unit. A signal $u_3(t)$ is determined from equation (1) and equation (8) as $$u_3(t)=u_{PIM}(t) \quad (9)$$

The parameters for the frequency $f_{PIM}$ and the signal form are transmitted via the BUS to the signal generator, where the signal $u_3(t)$ is generated.

For this purpose, the signal $u_3$ of the signal generator 212 is multiplied in the modulator, so that a signal is produced with the form:

$$u_c(t)=u_3(t)a_{rPIM}e^{j\phi} \quad (10)$$

Figure 6:
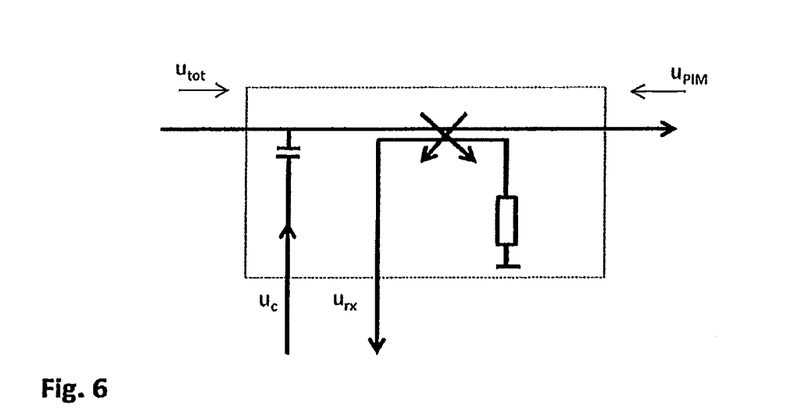
FIG. 6 is a schematic representation of the directional coupler.

Of key importance for the calculation of the correction signal $u_c$ is the separation of the signals $u_{PIM}$ and $u_{rPIM}$. In the first embodiment, this is achieved through the use of a directional coupler. In order to be able to calculate the amplitude $a_{rPIM}$ and phase $\phi_{rPIM}$, the signal $u_{rx2}$ is decoupled from the signal $u_{tot}$ in the coupler 213. The function of the coupler 213 is illustrated in FIG. 6. The transmission signal $u_{tot}$ is thereby fed into the input. The signal $u_{rx2}$ is decoupled, attenuated through the coupling attenuation k. As a result of the suboptimal directionality r, a part of the signal from $u_{PIM}$ from the DUT is also coupled into the signal $u_{rx2}$, so that the signal $u_{rx2}$ is derived from $$u_{rx2}=ku_{tot}+kru_{PIM} \quad (11)$$

The signal $u_{rx2}$ is received by the receiver 214 and the power $P_{rPIM}$ measured. The measuring bandwidth of the receiver 214 can differ from the measuring bandwidth of the receiver 206. The measured power is passed on via the BUS to the control unit.

Figure 7:
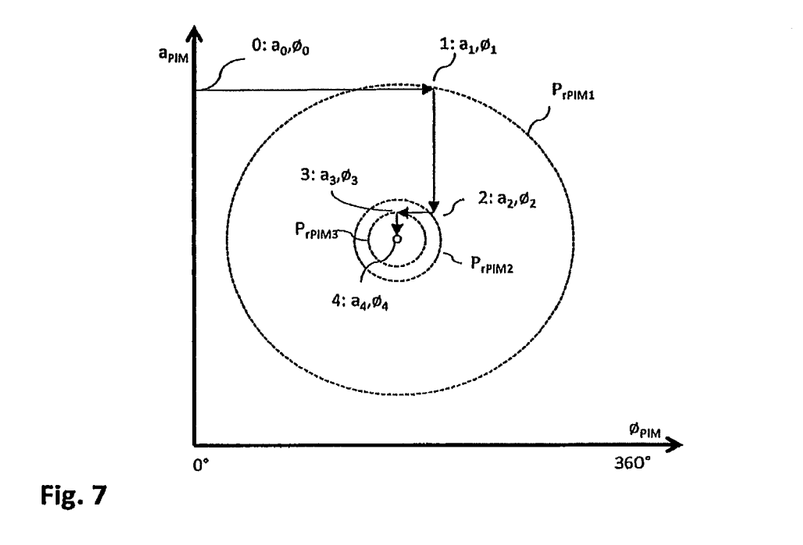
FIG. 7 is a schematic representation of an iterative method for generating and optimizing the compensation signal using the control parameters amplitude and phase.
Figure 8:
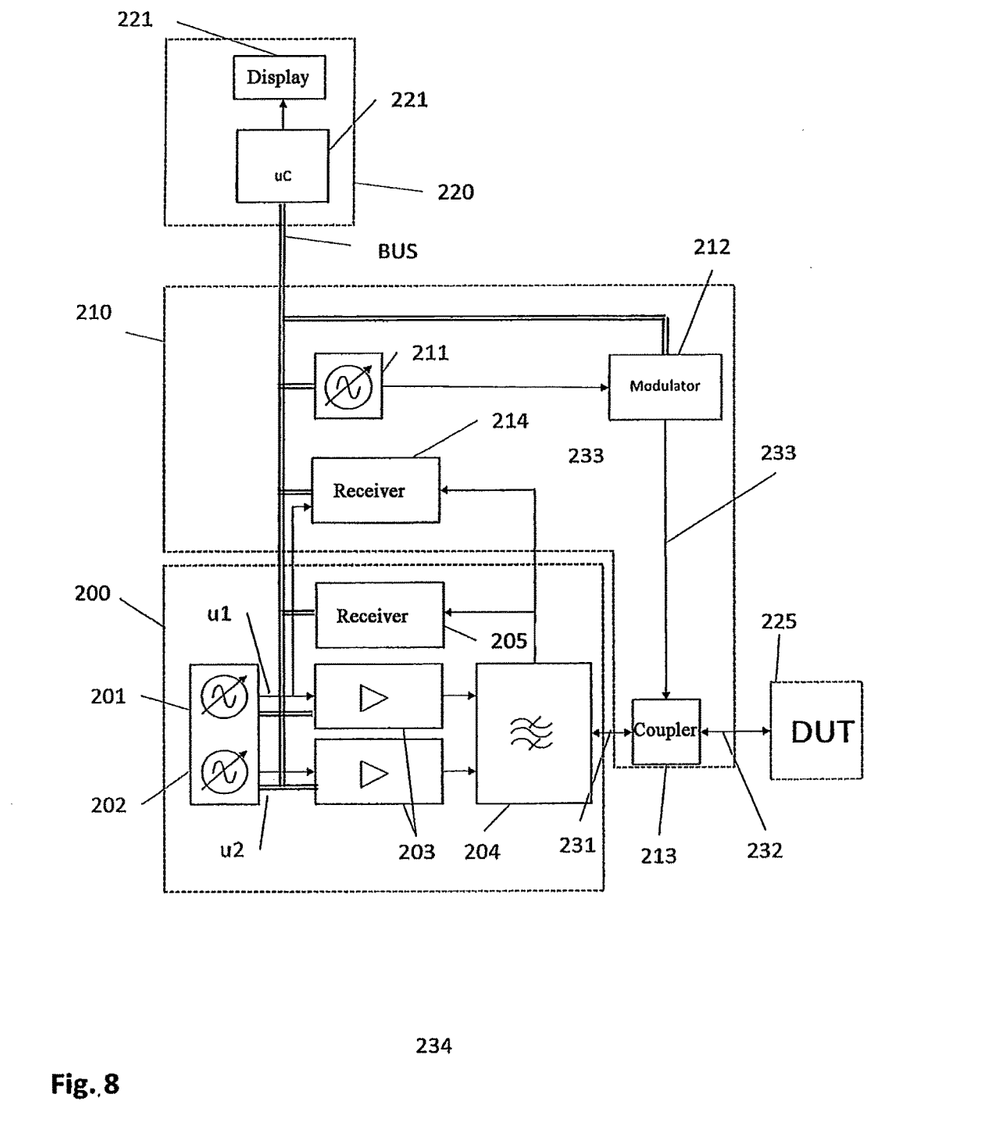
FIG. 8 is a schematic representation which shows a measuring device according to a second embodiment of the present invention designed to carry out the method according to the invention.

The signal form of $u_3(t)$ is known, in terms of frequency and signal form, and is calculated once before the measuring procedure and set on the signal generator via the BUS. Since the interference rPIM can be dependent on environmental influences, for example the temperature, it needs to be adjusted subsequently during the course of operation of the measuring device. The parameters $a_{rPIM}$ and $\phi_{rPIM}$ are used for regulation. For this purpose, the equation $$P_{rPIM}(a_{rPIM}, \phi_{rPIM})=0 \quad (12)$$

is solved. Since only one measured value $P_{rPIM}$ is available for the adjustment of 2 parameters this is done following an iterative method. Such an iterative method is represented by way of example in FIG. 7. The iteration process starts with the value pair 0: $a_0$, $\phi_0$. The measured amplitude of PIM can for example be used as an estimated value for $a_0$, by way of example $\phi_0=0°$ is used for $\phi_0$. For the first iteration step with the result 1: $a_1$, $\phi_1$, $\phi$ is varied with constant a until the measured power of $P_{rPIM}$ is minimal. In the example shown, $P_{rPIM1}$ is thereby achieved. In the second iteration step, the amplitude is varied with constant $\phi$ until the minimum value $P_{rPIM2}$ is again attained, where $P_{rPIM2}<P_{rPIM1}$. This method is repeated until no improvement in the measured power $P_{rPIM}$ results:

$$P_{rPIM,n+1} \approx P_{rPIM,n}$$

Alternative Embodiment

In an alternative embodiment, a different method of decoupling the received signal $u_{rx}$ and separating the rPIM and PIM interference is used.

Methods are used in measuring devices for measuring passive intermodulation which make possible a method for measuring the distance of the measuring device from a fault. A method is described in DE 10 2012 023 448 A1 which make such a measurement possible.

The signal $u_1$ is thereby frequency-modulated such that a signal form according to the method described in DE 10 2012 023 448 A1 results. The frequency $f_1$ is thereby varied continuously and repeatedly over time (swept) from a start frequency $f_{1start}$ to an end frequency $f_{1stop}$, so that $$f_1(t) = \frac{df}{dt}t \quad (13)$$

According to the disclosure in DE 10 2012 023 448 A1, the difference frequency $f_d$ is generated in the receiver, through which the distance to the fault I can be calculated according to:

$$l = \frac{cf_d}{2\frac{df}{dt}} \quad (14)$$

Figure 9:
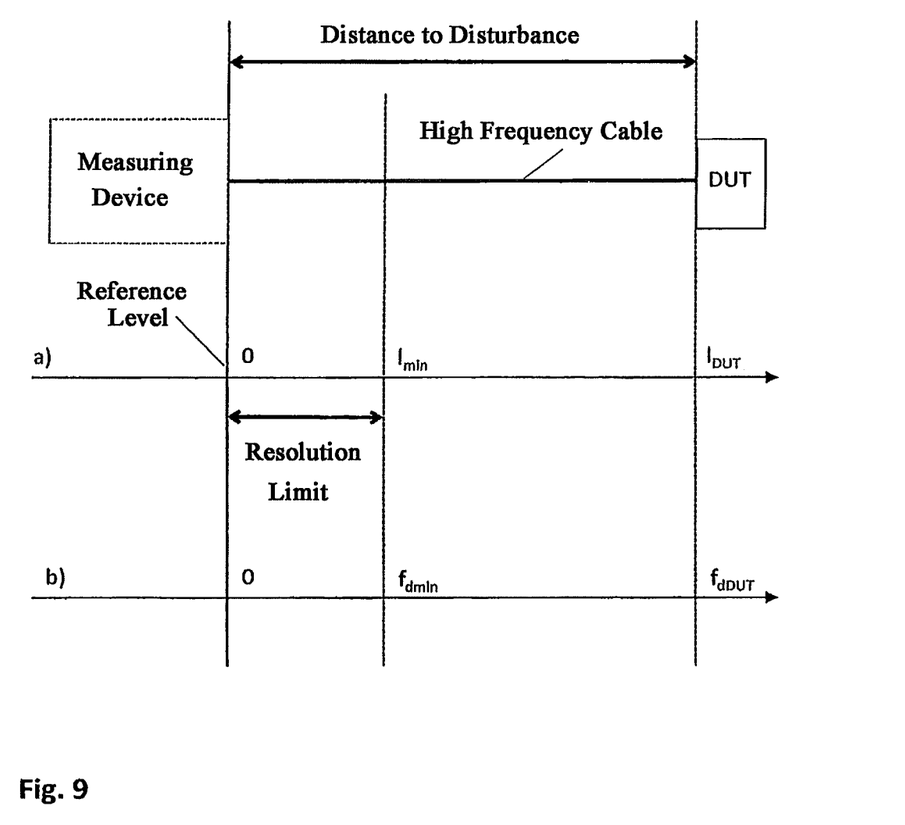
FIG. 9 shows the separation of inherent interference and intermodulation in the DUT by means of distance measurement.

FIG. 9 illustrates the relationship between the spatial arrangement of measuring device and DUT and the difference frequency $f_d$. FIG. 9a illustrates a measuring device, which is connected with the DUT through a cable with the length $l_{DUT}$. The corresponding frequency of the measuring signal $U_{mess}$ is represented in FIG. 9b. According to (14) an intermodulation in the DUT generates a measuring signal with the frequency $f_{dDUT}$.

In the second embodiment, the measuring signal is filtered, wherein only voltages with frequencies $<f_{dmin}$ are used to determine the power of rPIM. In this way, a separation of PIM and rPIM is achieved. Because only signals with frequencies $>f_{dDUT}$ are used for the measurement of PIM, a resolution limit of $I_{min}$ is achieved, which is defined as $$l_{min} = \frac{cf_{dmin}}{2\frac{df}{dt}} \quad (15)$$

The compensation signal can now be generated on the basis of the power determined for rPIM and introduced into the signal path.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for measuring passive intermodulation produced in a measurement segment of a signal transmission path, comprising the following steps:
   (a) generating a first High Frequency (HF) signal ($u_1(t)$) with a predetermined frequency progression and a second HF signal ($u_2(t)$) with a predetermined frequency progression;
   (b) feeding the first HF signal ($u_1(t)$) and the second HF signal ($u_2(t)$) into the signal transmission path, wherein an intermodulation signal is generated in the signal transmission path from the first HF signal ($u_1(t)$) and the second HF signal ($u_2(t)$) which contains a first intermodulation signal component ($u_{rPIM}(t)$) generated in an input segment of the signal transmission path and a second intermodulation signal component ($u_{PIM}(t)$) generated in the measurement segment of the signal transmission path;

(c) generating a compensation signal $u_c(t)$) depending on the first intermodulation signal component ($u_{rPIM}(t)$) generated in the input segment; and (d) introducing the compensation signal ($u_c(t)$) into the signal transmission path in order to reduce or cancel out the first intermodulation signal component ($u_{rPIM}(t)$).

2. The method of claim 1, including (e) measuring a reflected intermodulation signal component $u_{rx1}$ and from this locating one or more points in the measurement segment of the signal transmission path which are defective in terms of high frequency transmission characteristics of the signal transmission path.

3. The method of claim 2, wherein the first and/or the second HF signal are amplified, added and then introduced into the signal transmission path.

4. The method of claim 3 wherein at least a part of the first intermodulation signal component ($u_{rPIM}(t)$) is separated from the second intermodulation signal component ($u_{PIM}(t)$), using a directional coupler and/or a filter.

5. The method of claim 1, wherein the first and/or the second HF signal are amplified, added and then introduced into the signal transmission path.

6. The method of claim 1 wherein at least a part of the first intermodulation signal component ($u_{rPIM}(t)$) is separated from the second intermodulation signal component ($u_{PIM}(t)$), using a directional coupler and/or a filter.

7. The method of claim 6, wherein one or more variables such as a power, an amplitude, a phase or similar of the separated part is measured and the compensation signal ($u_c(t)$) is generated on the basis of at least one of the measured variables.

8. The method of claim 7 wherein the compensation signal ($u_c(t)$) is generated by a control loop with alternating adjustment of its amplitude $a_{rPIM}$ and its phase $\Phi_{rPIM}$ such that the power of the separated part of the first intermodulation signal component ($u_{rPIM}(t)$) is minimized.

9. The method of claim 7 wherein the compensation signal ($u_c(t)$) is controlled in an iterative method such that maximum compensation of the first intermodulation signal component($u_{rPIM}(t)$) is achieved when it is introduced.

10. The method of claim 9 wherein the compensation signal ($u_c(t)$) is introduced into the signal transmission path between the input segment and the measurement segment by a directional coupler.

11. The method of claim 1 wherein the compensation signal ($u_c(t)$) is controlled in an iterative method such that maximum compensation of the first intermodulation signal component ($u_{rPIM}(t)$) is achieved when it is introduced.

12. The method of claim 1 wherein the compensation signal ($u_c(t)$) is introduced into the signal transmission path between the input segment and the measurement segment by a directional coupler.

13. The method of claim 1 wherein a variable such as an amplitude, a phase and/or a time delay of the first intermodulation signal component ($u_{rPIM}(t)$) is determined by a time window method.

14. The method of claim 1 wherein the first HF signal ($u_1(t)$) and the second HF signal ($u_2(t)$) are generated with predetermined different carrier frequencies $f_1$, $f_2$, wherein a digital signal is modulated onto at least one of the carrier frequencies.

15. The method of claim 14 wherein the first carrier frequency $f_1$ and/or the second carrier frequency $f_2$ are modulated such that an intermodulation signal generated from the two HF signals contains information on the points at which intermodulation signal components contained therein are generated.

16. The method of claim 14 wherein the frequency $f_1$ of the first HF signal ($u_1(t)$) is varied continuously and repeatedly over time (swept) from a predetermined initial frequency $f_{START}$ to a predetermined end frequency $f_{END}$, with a predetermined rate of change df/dt over time, and that the second HF signal ($u_2(t)$) is generated with a constant predetermined frequency $f_2$.

17. A measuring device for measuring passive intermodulation produced in a measurement segment of a signal transmission path including:

two signal sources for generating two High Frequency (HF) signals;

a combiner for combining the two HF signals and introducing them into the signal transmission path with an input segment and the adjoining measurement segment; and a device such as a filter for decoupling an intermodulation signal component generated in the signal transmission path, and a compensation unit for generating a compensation signal ($u_c(t)$) depending on the component of the intermodulation signal generated in the input segment of the signal transmission path and for coupling the compensation signal ($u_c(t)$) into the signal transmission path;

wherein the measuring device is capable of implementing the following steps:

(a) generating a first (HF) signal ($u_1(t)$) with a predetermined frequency progression and a second HF signal ($u_2(t)$) with a predetermined frequency progression;

(b) feeding the first HF signal ($u_1(t)$) and the second HF signal ($u_2(t)$) into the signal transmission path, wherein an intermodulation signal is generated in the signal transmission path from the first HF signal ($u_1(t)$) and the second HF signal ($u_2(t)$) which contains a first intermodulation signal component ($u_{rPIM}(t)$) generated in the input segment of the signal transmission path and a second intermodulation signal component ($u_{PIM}(t)$) generated in the measurement segment of the signal transmission path;

(c) generating the compensation signal ($u_c t$)) depending on the first intermodulation signal component ($u_{rPIM}(t)$) generated in the input segment; and (d) introducing the compensation signal ($u_c(t)$) into the signal transmission path in order to reduce or cancel out the first intermodulation signal component ($u_{rPIM}(t)$).

18. The measuring device of claim 17, including a directional coupler, arranged in the signal transmission path between the input segment and the measurement segment, for coupling the compensation signal ($u_c(t)$) into the signal transmission path and/or for decoupling a signal component urx2 running in from the input segment.

19. The measuring device of claim 17, including a third signal source and a modulator for generating the compensation signal in an iterative method such that a minimization of the first intermodulation signal component ($u_{rPIM}(t)$) is achieved.

* * * * *

UNITED STATES PATENT AND TRADEMARK OFFICE
CERTIFICATE OF CORRECTION

PATENT NO. : 10,270,546 B2
APPLICATION NO. : 15/511526
DATED : April 23, 2019
INVENTOR(S) : Christian Entsfellner, Benjamin Kaindl and Martin Schwab Page 1 of 1

It is certified that error appears in the above-identified patent and that said Letters Patent is hereby corrected as shown below:

In the Specification

In Column 1, Line 33, delete "modem" and substitute therefore --modern--

In Column 1, Line 35, delete "and." and substitute therefore --and--

Signed and Sealed this
Thirteenth Day of August, 2019

Andrei Iancu
*Director of the United States Patent and Trademark Office*